United States Patent
Goh et al.

(10) Patent No.: US 8,681,857 B2
(45) Date of Patent: Mar. 25, 2014

(54) MACRO-BLOCK QUANTIZATION REACTIVITY COMPENSATION

(75) Inventors: Kwong-Huang Goh, Singapore (SG); Lucas Y. W. Hui, Singapore (SG)

(73) Assignee: STMicroelectronics Asia Pacific PTE., Ltd., Singapore (SG)

(*) Notice: Subject to any disclaimer, the term of this patent is extended or adjusted under 35 U.S.C. 154(b) by 1861 days.

(21) Appl. No.: 11/525,202

(22) Filed: Sep. 21, 2006

(65) Prior Publication Data

US 2007/0081590 A1   Apr. 12, 2007

(30) Foreign Application Priority Data

Oct. 4, 2005   (SG) .................................. 200506440

(51) Int. Cl.
*H04N 7/12*   (2006.01)
(52) U.S. Cl.
USPC .................................................. 375/240.03
(58) Field of Classification Search
USPC ........................................ 375/240.03–240.06
IPC ...................................................... H04N 7/12
See application file for complete search history.

(56) References Cited

U.S. PATENT DOCUMENTS

| | | | | |
|---|---|---|---|---|
| 5,500,689 A | * | 3/1996 | Lam ............................... | 348/699 |
| 7,251,275 B2 | * | 7/2007 | Wu et al. ................... | 375/240.03 |
| 7,388,912 B1 | * | 6/2008 | Katsavounidis et al. | 375/240.02 |
| 7,453,938 B2 | * | 11/2008 | Haskell et al. ........... | 375/240.03 |
| 2002/0168012 A1 | * | 11/2002 | Ramaswamy ........... | 375/240.29 |
| 2004/0252758 A1 | * | 12/2004 | Katsavounidis et al. | .. 375/240.2 |
| 2006/0013298 A1 | * | 1/2006 | Tong et al. ............... | 375/240.03 |
| 2006/0171457 A1 | * | 8/2006 | DeGarrido et al. ...... | 375/240.03 |

\* cited by examiner

*Primary Examiner* — Dave Czekaj
*Assistant Examiner* — Tracy Li
(74) *Attorney, Agent, or Firm* — Munck Wilson Mandala, LLP

(57) ABSTRACT

A macro-block (MB) quantization reactivity compensation method for a video encoder is provided. The method calculates a reference picture quantization value based on a calculated picture complexity. This predicted reference quantization is combined with the bits-used reactive MB reference quantization value to determine the final MB reference quantization value. This MB reference quantization value is also made adaptive to the VBV buffer fullness, as well as to the predicted change of the current picture complexity. A video encoder and an article of manufacture that comprises computer readable program code for execution of the method are also provided.

22 Claims, 4 Drawing Sheets

MACRO-BLOCK QUANTIZATION REACTIVITY COMPENSATION

CROSS-REFERENCE TO RELATED APPLICATIONS

The present application is related to Singapore Patent No. 200506440-7, filed Oct. 4, 2005, entitled "MACRO-BLOCK QUANTIZATION REACTIVITY COMPENSATION". Singapore Patent No. 200506440-7 is assigned to the assignee of the present application and is hereby incorporated by reference into the present disclosure as if fully set forth herein. The present application hereby claims priority under 35 U.S.C. §119(a) to Singapore Patent No. 200506440-7.

TECHNICAL FIELD

The present disclosure generally relates to video encoding technologies, and more particularly to a macro-block (MB) quantization reactivity compensation to reduce or compensate the MB level quantization reactivity to MB bits-used.

BACKGROUND

In most MPEG-2 standards (e.g., MPEG-2 Test Model-5, draft revision 2, April 1993), pictures are classified as intra or I pictures, predictive or P pictures, and bi-directionally predictive or B pictures. An 'I' picture contains only intra macro-block (MB). A 'P' picture may contain inter MB, but only forward directed predictions from a preceding reference picture are permitted. A 'B' picture can contain intra MB, inter MB that are forward motion compensated, inter MB that are backward motion compensated, and inter MB that are bidirectionally motion compensated. A group of pictures (GOP) is formed in encoded order starting with an I-picture and ending with the picture before the next I-picture in the sequence.

Each picture is typically divided into non-overlapping MB, where each MB includes a 16×16 array of luminance samples and each block or array of 8×8 chrominance samples overlaid thereon. A decision is made to encode the MB as an inter MB, in which case the MB is both temporally and spatially encoded, or to encode the MB as an intra MB, in which case the MB is only spatially encoded.

Conventional coding techniques generate variable bit-rates for different MB within a picture because different types of MB use variable bits. To transmit the variable rate bit stream in a fixed rate, a 'virtual buffer' is provided within an encoder so that the output bits can be controlled by a rate control method. Therefore, the main purpose of the rate control method is to compute the quantization step-size based on the macro-block-level computed 'virtual buffer', so as to generate a constant bit rate for targets. To regulate the fluctuation of the coding rate, there is a need to allocate the compressed bit of each frame by choosing a suitable quantization parameter for each MB. The fundamental buffer control strategy adjusts the quantizer scale according to the level of buffer utilization. When the buffer utilization is high, the quantization level should be increased accordingly.

The quantization step-size has direct impact on the number of bits produced at the output of run-length VLC encoding process, and therefore the average output bit rate. It has also a direct impact on the encoding quality, which represents the output picture quality at the corresponding decoder. In general, larger quantization step-size generates lower output bit rate and lower encoding quality. In order to control output bit rate and picture quality so that the resulting bit stream can satisfy channel bandwidth or storage limitation as well as quality requirements, rate control and quantization control methods are used.

The rate control and quantization control for a MPEG-2 video encoder comprises the steps of allocating bit target for each picture and computing MB reference quantization values. A target number of bits for coding a picture is first determined based on target output bit-rate, picture coding type, bit usage, and average quantization step-sizes of past coded pictures. With the determined target number of bits, the reference quantization step-size is calculated for each MB of the picture. This reference quantization step-size is then used for encoding the MB of the picture.

The 'virtual buffer' is used to determine the MB reference quantization parameter. Before encoding MB j (j>=1), the fullness of the appropriate virtual buffer (Dj) is first computed. Each of the three picture types has a virtual buffer associated with it and these buffers are updated after coding each MB of the picture type according to Equation 1 below:

$$D_j = D_0 - \frac{T_{pict}}{MB_{cnt}} \times (j-1) + B_{j-1} \quad \text{(Eqn. 1)}$$

where j is the current MB count; $D_0$ the initial fullness of Virtual Buffer (each I/P/B); $MB_{cnt}$ the total number of MB in a picture; $B_{j-1}$ number of bit generated by encoding all MB up to j−1; and $T_{pict}$ the Target Picture Bits Allocation (Ti/Tp/Tb).

At picture level, $D_0$ is updated as: $D_0 = D_j$. The above equation is basically tracking the difference between the actual number of bits used and the target bits allocated, and then this difference is added to the respective virtual buffer.

The MB reference quantization step-size $Q_j$ is then computed from the virtual buffer fullness, $D_j$. This allows the rate controller to control the bits allocation based on consumption pattern of the picture:

$$Q_j = (D_j \ast 31)/r \quad \text{(Eqn. 2)}$$

where r is known as the reactive parameter=2*$Bit_{13}$ Rate/Picture_Rate.

The reaction parameter is a factor that can control the sensitivity of the method from a change in $D_j$. Larger r values will cause the reaction to be slower, which may cause the target bits and actual bits to differ significantly. However, larger r values bring about a more gradual rate of change in bits consumption. On the other hand, a small r value causes the controller to be more reactive to changes, giving rise to a closer target and actual bits value.

Thus, in conventional rate controls, to achieve bits used near to the target allocation, the reference $Q_j$ is adjusted in every MB according to the bits-used in the previous MBs and the remaining target bits left for the remaining MBs in the picture. As the bits-used for each MB are different, the reference $Q_j$ is adjusted up or down, so that the bits-used moves towards the target. This MB reference $Q_j$ is not ideal for picture quality as it is reactive to the up-to-date bits-used. To tackle the variation of $Q_j$ for each MB in a picture, the prior art provides two-pass method that obtains the actual $Q_j$ for each MB first and then calculates the average $Q_j$ based on the actual $Q_j$, where the average $Q_j$ will be used for quantization of each MB. If the average $Q_j$ of the current encoding picture is known using the two-pass method, it would then be more ideal to use it as the reference quantization for the picture so that the closeness of the bits-used to the target would be similar to using the MB-level adjusted reference $Q_j$. However, using two-pass or multi-pass method to determine the ideal reference quantization will result in more complex implementation.

There is therefore a need for MB MB quantization reactivity compensation that generally reduces or compensates the MB level $Q_j$ reactivity. In particular, this is a need for a system of predicting the picture average reference Qj and using the picture average reference Qj as the reference picture Qj.

SUMMARY

This disclosure provides an MB quantization reactivity compensation that generally reduces or compensates the MB level Qj reactivity by predicting the picture average reference Qj and using it as the reference picture Qj.

Another objective is to achieve a reasonable closeness of the bits-used to the target bits using the predicted average reference Qj that is combined with the MB-level bits-used reactivity Qj by means of weighted combination to form the final reference Qj. This weighted combination is made adaptive to the VBV buffer fullness to avoid any likely overflow and underflow. It is also made adaptive to any sudden change of picture complexity, by means of predicting any sudden change in picture via simple comparison of field picture differences.

Another objective is to avoid the complex multi-pass determination of the picture average reference Qj, by means of prediction before the end of the picture encoding, based on previous bits-used information, or in another words, prediction in single-pass so that the implementation complexity is reduced.

In one embodiment, the present disclosure provides a method for compensating macro-block (MB) level quantization reactivity to MB bits-used for a current encoding picture in a sequence of pictures. The method includes determining a picture complexity of a previous encoding picture of the sequence of pictures. The method also includes predicting a reference picture quantization value for the current encoding picture. The method still further includes producing a final MB reference quantization values for each MB of the current encoding picture by combining the predicted reference picture quantization value and a reactive MB reference quantization value for the encoding MB.

In another embodiment, the present disclosure provides a video encoder for encoding sequences of pictures by compensating MB level quantization reactivity to MB bits-used for a current encoding picture during the encoding process wherein each picture is divided into MB which are processed and encoded based on an MB quantization value. The encoder includes a first module to determine the picture complexity of a previous encoded picture of the sequences of pictures. The encoder also includes a second module to predict the reference picture quantization value for the current encoding picture. The encoder further includes a third module to produce the final MB reference quantization values for each MB of the current encoding picture by combining the predicted reference picture quantization value and the reactive MB reference quantization value for the encoding MB.

In still another embodiment, the present disclosure provides an article of manufacture. The article includes at least one computer usable medium having computer readable program code embodied therein for encoding sequences of pictures by compensating MB level quantization reactivity to MB bits-used for a current encoding picture during the encoding process wherein each picture is divided into MB which are processed and encoded based on an MB quantization value. The computer readable program code causes a computer to determine the picture complexity of a previous encoded picture of the sequences of pictures. The computer program code also causes a computer to predict the reference picture quantization value for the current encoding picture. The computer readable program code also causes a computer to produce the final MB reference quantization values for each MB of the current encoding picture by combining the predicted reference picture quantization value and the reactive MB reference quantization value for the encoding MB.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Throughout this application, where publications are referenced, the disclosures of these publications are hereby incorporated by reference, in their entireties, into this application in order to more fully describe the state of art to which this disclosure pertains.

Figure 1:
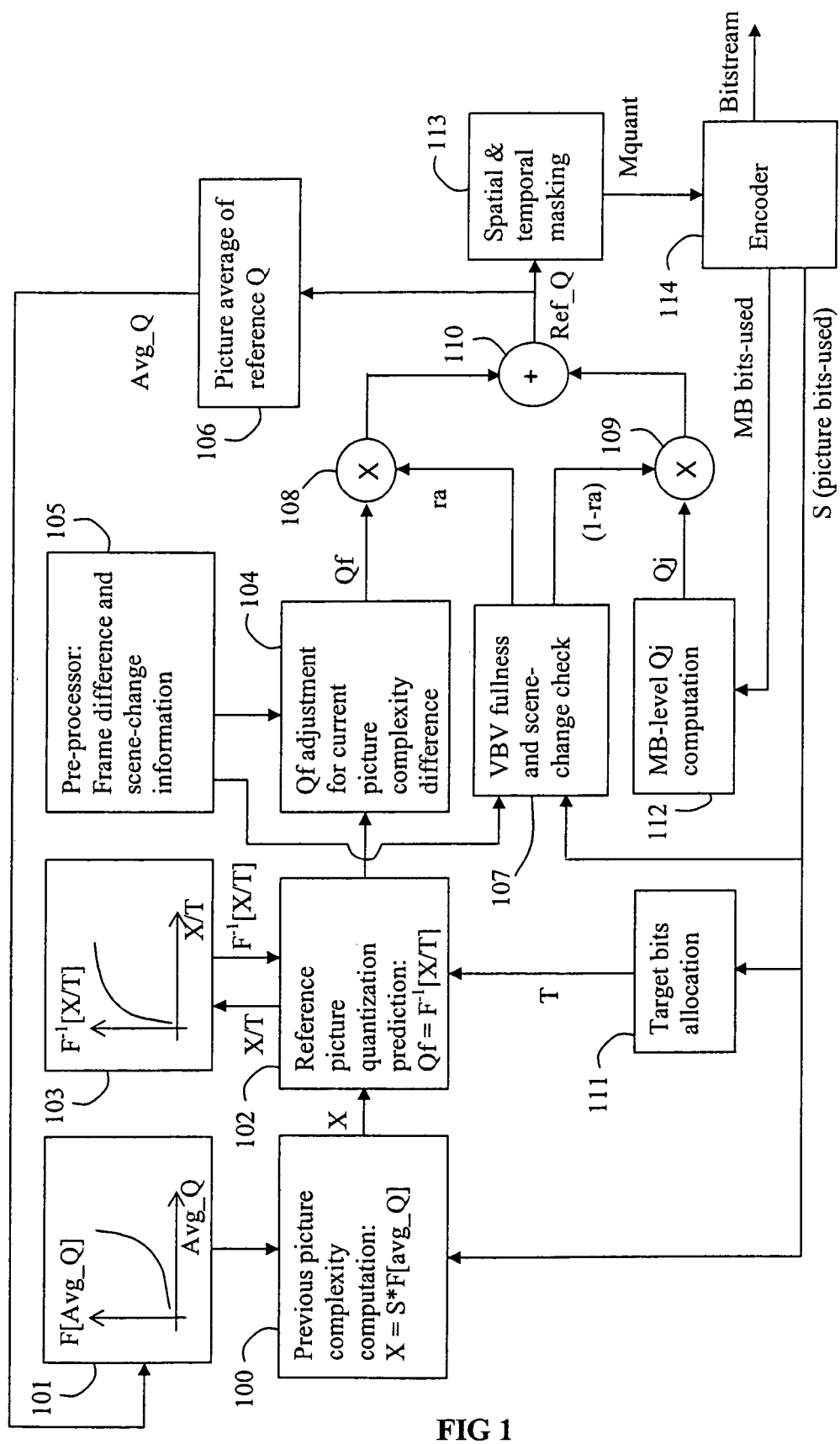
FIG. 1 is an exemplary functional block diagram of the MB quantization reactivity compensation method in accordance with one embodiment of the present disclosure.

Some embodiments of the present disclosure provide a MB quantization reactivity compensation method that reduces or compensates the above-mentioned MB level Qj reactivity. An exemplary functional block diagram of the MB quantization reactivity compensation method in accordance with one embodiment of the present disclosure is shown in FIG. 1. It is to be appreciated that the hardware and software for encoding a video input in a MPEG-2 compliant encoder are well known to those skilled in the art. Therefore, no more details will be provided for the known technologies for the sake of brevity and clarity. Furthermore, the steps of the method will be described sequentially, but it by no means denotes that the method must be practiced sequentially as described, unless such a sequential requirement is explicated stated herein.

Referring now to FIG. 1, the MB quantization reactivity compensation method comprises steps of computing the picture complexity X 100 of the previous encoded picture, predicting the reference picture quantization Qf 102 for the current picture that is to be encoded, making adjustment to the predicted reference picture quantization Qf 102 for current picture complexity difference 104, and combining the predicted reference picture quantization Qf and the reactive MB reference Qj to produce the final MB reference quantization Ref_Q.

Computation of the Previous Encoded Picture Complexity X 100

According to, for example, MPEG-2 Test Model 5, picture complexity measure is defined as the product of the bits generated and the average quantization parameter. In TM 5, separate complexity measures are defined for I, P, and B picture types. Complexity is a relative measure to describe the difficulties in coding a frame, as compared to other frames in the same sequence. Complexity changes are also dependent on picture types, and picture content. However, since the complexity changes for every frame result from the same cause (change of standard, encoders, and bit rate), it is reasonable to assume that the complexity change ratio for the same picture type is relatively constant, at least over a short period of time.

Figure 2:
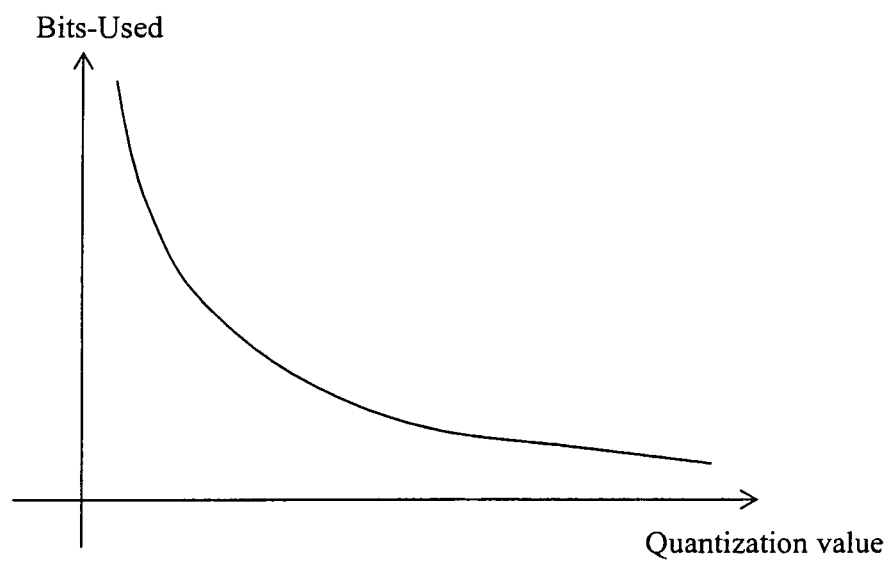
FIG. 2 shows an exemplary bits-used function S[Q] of quantization Q used to encode a sequence.

The relationship between bit-rate (or bits-used) and the quantization value has an exponentially decreasing-like shape, (i.e., as the quantization step-size increases, the bit-rate or bits-used decreases exponentially.) FIG. 2 shows an exemplary bits-used function S[Q] of quantization Q used to encode a sequence.

The MB quantization reactivity compensation method provides the computation of the previous encoded picture complexity 100 using Equation 3 below:

$$X=S*F[avg\_Q]$$ (Eqn. 3)

where X is the previous encoded picture complexity 100; S the bits-used for the previous encoded picture; avg_Q the previous encoded picture average reference quantization step-size 106; and F[avg_Q] 101 the pre-defined function of the avg_Q.

Figure 3:
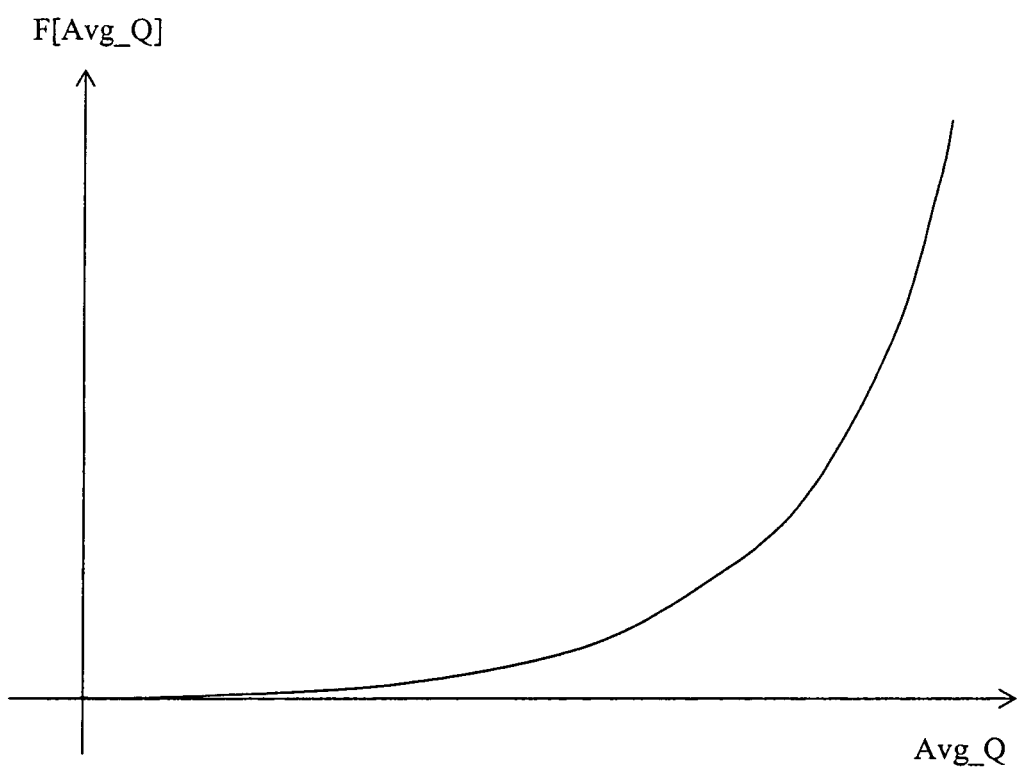
FIG. 3 is an example of function F[avg_Q]

Therefore, assuming the picture complexity in the equation (1) is constant in a sequence, then the function F[avg_Q] of the equation (1) should have the behavior or shape like K/S[Q], where K is a constant and S [Q] is the bits-used function of the quantization Q. In other words, F[avg_Q] should be the reciprocal of a bits-used function of quantization. An example of the F[avg_Q] function is shown in FIG. 3.

Prediction of the Current Reference Picture Quantization Qf 102

With the computed encoded picture complexity 100 above, the current reference picture quantization Qf 102 for the same picture-type can be predicted using Equation 4 below:

$$Qf=F^{-1}[X/T]$$ (Eqn. 4)

where X is the computed previous encoded picture complexity; T the target bits allocated for the current picture of the same picture-type; and $F^{-1}$ is the inverse function of the function of F.

Adjustment to the Predicted Reference Picture Quantization Qf 102

It is apparent that the aforementioned prediction method for the current reference picture quantization Qf 102 assumes that the complexity of the current encoding picture is similar to that of the previous encoded picture. Therefore, the predicted Qf will likely not be ideal if there is a change in the current picture's complexity.

The predicted reference picture quantization Qf 102 is adjusted to accommodate the changes of the current picture's complexity. The adjustment may be made using the frame difference and scene-change information such as the accumulated absolute pixel difference that is probably available in the pre-processor 105 of an encoder system.

In one embodiment of the present disclosure, the adjustment to Qf is based on the comparison of frame difference between current and previous frame, FD(n,n-1), with the frame difference between previous and $2^{nd}$ previous frame, FD(n-1, n-2), as seen in the following pseudocode:

```
If ( FD(n,n-1) /FD(n-1, n-2) > thres_high)
    Qf = Qf + delta
If ( FD(n,n-1) /FD(n-1, n-2) < thres_low)
    Qf = Qf - delta
```

When the current frame difference FD(n,n-1) is significantly higher than the previous frame difference FD(n-1, n-2), the encoding complexity is generally higher due to lesser similarity between current and previous picture compared to between previous and $2^{nd}$ previous picture. Therefore, the expected quantization is generally higher than that in the case of similar complexity, and vice versa for the case of significantly lower current frame difference. Example values for thres_high and thres_low are 1.4 and 0.7 respectively, and the delta value can be 1 (for quantization step-size of 1-32).

Combination of the Predicted Reference Picture Quantization Qf and the Reactive MB Reference Qj to Produce the Final MB Reference Quantization Ref_Q The predicted reference picture quantization Qf 102 after adjustment 104 is combined with the reactive MB reference Qj 112 to produce a more accurate closeness of the actual bits-used to the target bits allocated. The reactive MB reference Qj 112 is obtained through any known method. The combination of the reference picture Qf and the reactive MB reference Qj produces the final MB reference quantization Ref_Q by the adder 110.

The final MB reference quantization Ref_Q may be obtained by means of weighted combination performed by the multipliers 108, 109 with Equation 5, below:

$$Ref\_Q=Qj*(1-ra)+Qf*ra$$ (Eqn. 5)

where ra is a weighting parameter which is adaptive to the video buffer verifier (VBV) fullness; and the value of ra is: 0<ra<1. The new Ref_Q is therefore a balance of the predicted reference picture Qf and the MB reference Qj, with the reactive Qj compensated by the constant reference picture Qf.

To avoid the video buffer verifier (VBV) buffer overflow or underflow, the ra is set such that it is adaptive to the VBV buffer status. The method of adjusting ra based on VBV buffer size is as the following pseudo code:

```
If (VBV_fullness < VBV_Min)
    ra = 0;
else if(VBV_fullness <= VBV_Mid)
    ra = (VBV_fullness – VBV_Min)*ra_Max /(VBV_Mid –
    VBV_Min)
else if(VBV_fullness > VBV_Max)
    ra   =   (VBV_buffer_sizeVBV_fullness)*ra_Max
    /(VBV_buffer_size-VBV_Max)
else
    ra = ra_Max
```

The VBV_fullness is the picture-level fullness of the VBV buffer. Example values of the VBV_Min is 0.2*VBV_buffer_size, example value of VBV_Mid is 0.4*VBV_buffer_size, and VBV_Max is 0.9*VBV_buffer_size. An example value of ra_Max may be 0.7.

Figure 4:
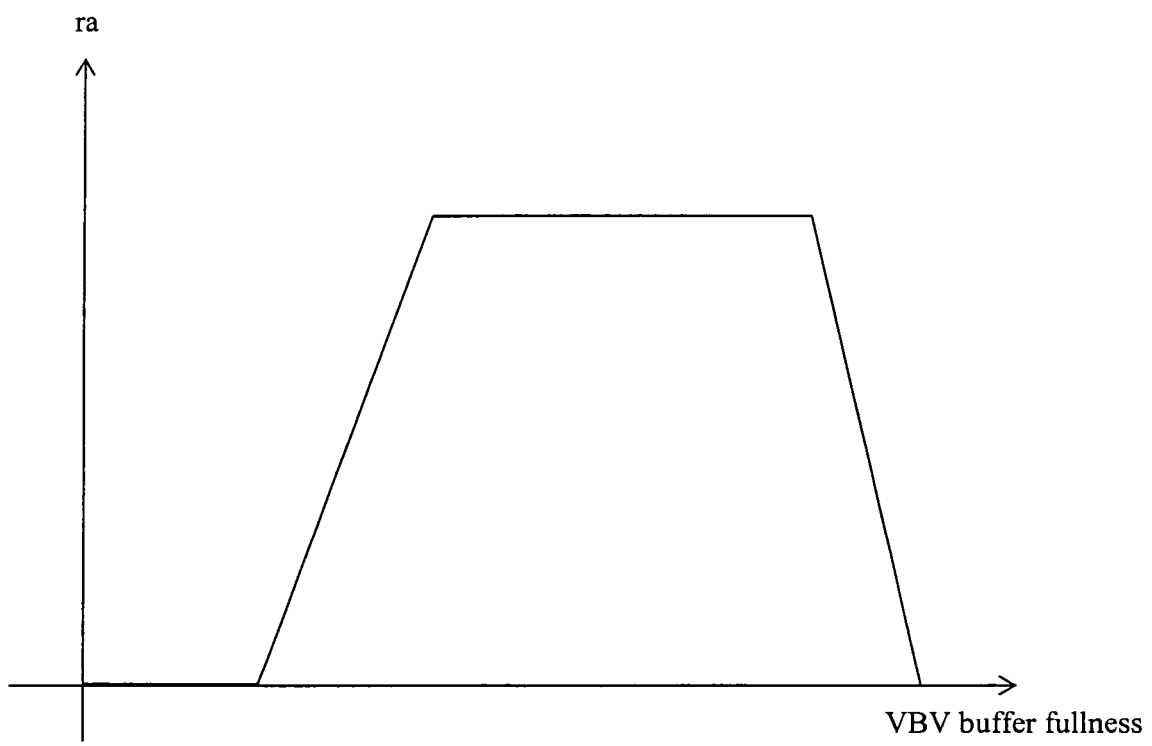
FIG. 4 shows the ra plot against the VBV buffer fullness.

The weighting parameter ra will be reduced to zero when the VBV buffer fullness is near its underflow and overflow levels. These values are chosen such that when the VBV controls are activated, there will be minimum use of Qf so that $Q_j$ will be adjusted towards achieving S nearer to T. An illustration of an ra plot against the VBV buffer fullness is shown in FIG. 4.

It should be understood that it may take a few frames for the MB reference Qj to 'settle down' or 'stabilize' for the desired bit-rate. Therefore for scene-change and at beginning of encoding the sequence, the predicted Qf should not be used immediately, instead, the Qj should be used for first few pictures so that bits-used is nearer to the target bits allocated and rate control is more stable, and then avg_Qj is used to predict the reference Qf. One example is to set ra to zero for a certain number of pictures after a scene-change and at the beginning of a sequence encoding, for example set ra=0 for first 4 P-pictures, first 8 B-pictures and first 2 I-pictures after scene-change and start of sequence.

Using a method in accordance with one embodiment of the present disclosure to compute the MB-level reference quantization value reduces the MB-level quantization reactivity caused by the MB-level adjustment that is solely based on the MB bits-used. Therefore, the present method gives a smaller variance of the reference MB quantization within the picture and also improves the objective quality in terms of peak signal-to-noise ratio (PSNR).

Embodiments of the present disclosure may be added or implemented easily by software modification of any existing MB quantization computation method for constant bit-rate encoder system.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for compensating macro-block (MB) level quantization reactivity to MB bits-used for a current encoding picture in a sequence of pictures, the method comprising:
   determining a picture complexity of a previous encoding picture on:
      bits used for the previous encoding picture in the sequence of pictures, and
      an output value from a first function of an average reference quantization step size given the average reference quantization step size for the previous encoding picture;
   predicting a reference picture quantization value for the current encoding picture based on;
      an output value from a second function of the picture complexity of the previous encoding picture and a number of target bits given the determined picture complexity of the previous encoding picture, and
      a number of target bits allocated for the current encoding picture, wherein the second function is an inverse of the first function; and
   producing final MB reference quantization values for each MB of the current encoding picture by combining the predicted reference picture quantization value and a reactive MB reference quantization value for the respective MB, wherein the reactive MB reference quantization value is determined based upon the respective MB rather than the previous encoding picture and can vary between MBs within the current encoding picture.

2. The method of claim 1, wherein the output value from the second function comprises an output value of a function of the picture complexity of the previously encoding picture, and a number of target bits given a ratio of the determined picture complexity of the previous encoding picture and the number of target bits allocated for the current encoding picture.

3. The method of claim 2, wherein further comprising:
   adjusting the predicted reference picture quantization value comprises by:
      determining a ratio of the a frame difference FD(n,n−1) between the current encoding picture (n) and the previous encoding picture (n−1) to the a frame difference (FD(n−1,n−2)) between the previous encoding picture (n−1) and a picture (n−2) before the previous encoding picture in the sequence of pictures,
   adding a pre-defined value to the predicted reference picture quantization value if the a ratio (FD(n,n−1)/FD(n−1,n−2)) is higher than a first pre-defined threshold, and
   subtracting a pre-defined value from the predicted reference picture quantization value if the ratio (FD(n,n−1)/FD(n−1,n−2)) is lower than a second pre-defined threshold.

4. The method of claim 1, wherein determining the picture complexity of a previous encoding picture in the sequences of pictures comprises:
   determining an average reference picture quantization value;
   determining an output value of a pre-defined function of the average reference picture quantization value; and
   determining the picture complexity by multiplying MB bits-used in encoding the previous encoding picture with the output value.

5. The method of claim 1, wherein predicting the reference picture quantization value for the current encoding picture comprises:
   calculating an input to an inverse function $F^{-1}[x]$ by dividing the previous picture complexity by the number of target bits allocated for the current encoding picture; and
   determining the predicted reference picture quantization value, which is an output value of the inverse function $F^{-1}[x]$ using the calculated input.

6. The method of claim 1, wherein producing the final MB reference quantization values for each MB of the current encoding picture comprises:
   multiplying the predicted reference picture quantization value with a reaction parameter ra, which has a value between 0 and 1, to produce a first product;
   multiplying the reactive MB reference quantization value with (1-ra) to produce a second product; and
   adding the first and second products to determine the final MB reference quantization value.

7. The method of claim 6, wherein ra is determined according to a video buffer verifier (VBV) buffer fullness, the method further comprising:
   if the VBV buffer fullness is less than a pre-defined value VBV_Min, then setting ra to zero;
   if the VBV buffer fullness is more than the pre-defined value VBV_Min and less than or equal to a pre-defined value VBV_Mid which is higher than VBV_Min, then setting ra to (VBV_fullness−VBV_Min)*ra_Max/(VBV_Mid−VBV_Min), wherein ra_Max is a maximum value allowed for ra;
   if the VBV buffer fullness is more than a pre-defined value VBV_Max which is higher than VBV_Mid, then setting ra to (VBV_buffer_size−VBV_fullness)*ra_Max/(VB- V_buffer_size−VBV_Max), wherein VBV_Max is less than a VBV buffer size used; and if the VBV fullness is between VBV_Mid and VBV_Max, then setting ra to ra_Max.

8. The method of claim 6, wherein producing final MB reference quantization values for each MB of the current encoding picture by combining the predicted reference picture quantization value for the respective MB and reactive MB reference quantization value for the respective MB is adaptive to scene-change detection so that ra can be determined by:

if there is a scene-change occurring at the current encoding picture, then setting ra to zero for a pre-defined number of subsequent I-pictures in the sequence of pictures, for a pre-defined number of subsequent P-pictures in the sequence of pictures, and for a pre-defined number of subsequent B-pictures in the sequence of pictures.

9. A video encoder for encoding sequences of pictures by compensating macro-block (MB) level quantization reactivity to MB bits-used for a current encoding picture during encoding, wherein each picture is divided into MB which are processed and encoded based on an MB quantization value, the encoder comprising:

a first module configured to determine a picture complexity of a previous encoding picture based on:
bits used for the previous encoding picture in a sequence of pictures, and
an output value from a first function of an average reference quantization step size given the average reference quantization step size for the previous encoding picture; and a second module configured to predict a reference picture quantization value for the current encoding picture in the sequence of pictures based on:
an output value from a second function of the picture complexity of the previous encoding picture and a number of target bits given the determined picture complexity of the previous encoding picture and a number of target bits allocated for the current encoding picture, wherein the second function is an inverse of the first function, and to produce final MB reference quantization values for each MB of the current encoding picture by combining the predicted reference picture quantization value and a reactive MB reference quantization value for the respective MB.

10. The encoder of claim 9, wherein the output value from the second function comprises an output value of a function of a picture complexity of the previous encoding picture, and a number of target bits given a ratio of the determined picture complexity of the previous encoding picture and the number of target bits allocated for the current encoding picture.

11. The encoder of claim 10, further comprising a third module is configured to:

determine a ratio of a frame difference FD(n,n−1) between the current encoding picture (n) and the previous encoding picture (n−1) to a frame difference FD(n−1, n−2) between the previous encoding picture (n−1) and a picture (n−2) before the previous encoding picture in the sequence of pictures, and add a pre-defined value to the predicted reference picture quantization value if a ratio (FD(n,n−1)/FD(n−1,n−2)) is higher than a first pre-defined threshold, and subtract a pre-defined value from the predicted reference picture quantization value if the ratio (FD(n,n−1)/FD(n−1,n−2)) is lower than a second pre-defined threshold.

12. The encoder of claim 9, wherein the first module is configured to:
determine an average reference picture quantization value;
determine an output value of a pre-defined function of the average reference picture quantization value; and
determine the picture complexity of the previous encoding picture by multiplying the MB bits-used in encoding the previous encoding picture with the output value.

13. The encoder of claim 9, wherein the second module is configured to:
calculate an input to an inverse function $F^{-1}[x]$ by dividing the picture complexity of the previous encoding picture by the number of target bits allocated for the current encoding picture; and
determine the predicted reference picture quantization value, which is an output value of the inverse function $F^{-1}[x]$ using the calculated input.

14. The encoder of claim 9, wherein the second module is configured to:
multiply the predicted reference picture quantization value with a reaction parameter ra, which has a value between 0 and 1, to produce a first product;
multiply the reactive MB reference quantization value with (1-ra) to produce a second product; and
add the first and second products to determine the final MB reference quantization value.

15. The encoder of claim 14, wherein the second module is further configured to determine ra according to a video buffer verifier (VBV) buffer fullness, wherein:
if the VBV buffer fullness is less than a pre-defined value VBV_Min, ra is set to zero;
if the VBV buffer fullness is more than the pre-defined value VBV_Min and less than or equal to a pre-defined value VBV_Mid which is higher than VBV_Min, ra is set to (VBV_fullness−VBV_Min)*ra_Max/(VBV_Mid−VBV_Min), wherein ra_Max is a maximum value allowed for ra;
if the VBV buffer fullness is more than a pre-defined value VBV_Max which is higher than VBV_Mid, ra is set to (VBV_buffer_size−VBV_fullness)*ra_Max/(VBV_buffer_size−VBV_Max), wherein VBV_Max is less than a VBV buffer size used; and
if the VBV buffer fullness is between VBV_Mid and VBV_Max, ra is set to ra_Max.

16. An article of manufacture, comprising: at least one non-transitory computer usable medium having computer readable program code embodied therein for encoding sequences of pictures by compensating macro-block (MB) level quantization reactivity to MB bits-used for a current encoding picture during encoding, wherein each picture is divided into MB which are processed and encoded based on an MB quantization value, the computer readable program code in the article of manufacture comprising: computer readable program code for causing a computer to determine a picture complexity of a previous encoding picture based on bits used for the previous encoding picture in a sequence of pictures, and an output value from a first function of an average reference quantization step size given the average reference quantization step size for the previous encoding picture; and computer readable program code for causing a computer to predict a reference picture quantization value for the current encoding picture based on an output value from a second function of the picture complexity of the previous encoding picture and a number of target bits given the determined picture complexity of the previous encoding picture, wherein the second function is an inverse of the first function, and a number of target bits allocated for the current encoding picture~ and to produce final MB reference quantization values for each MB of the current encoding picture by combining the predicted reference picture quantization value and the reactive MB reference quantization value for the respective MB.

17. The article of manufacture of claim 16, wherein the output value from the second function comprises an output value of a function of the picture complexity of the previous encoding picture, and a number of target bits given a ratio of the determined picture complexity of the previous encoding picture and the number of target bits allocated for the current encoding picture.

18. The article of manufacture of claim 17, further comprising computer readable program code for causing a computer to adjust the predicted reference picture quantization value by:
    determining a ratio of a frame difference FD(n,n−1) between the current encoding picture (n) and the previous encoding picture (n−1) to a frame difference FD(n−1,n−2) between the previous encoding picture (n−1) and a picture (n−2) before the previous encoding picture in the sequence of pictures,
    adding a pre-defined value to the predicted reference picture quantization value if a ratio (FD(n,n−1)/FD(n−1,n−2)) is higher than a first pre-defined threshold, and
    subtracting a pre-defined value from the predicted reference picture quantization value if the ratio (FD(n,n−1)/FD(n−1,n−2)) is lower than a second pre-defined threshold.

19. The article of manufacture of claim 16, wherein the computer readable program code for causing a computer to determine the picture complexity of the previous encoding picture in the sequence of pictures comprises:
    computer readable program code for causing a computer to determine an average reference picture quantization value;
    computer readable program code for causing a computer to determine an output value of a pre-defined function of the average reference picture quantization value; and
    computer readable program code for causing a computer to determine the picture complexity of the previous encoding picture by multiplying MB bits-used in encoding the previous encoding picture with the output value.

20. The article of manufacture of claim 16, wherein the computer readable program code for causing a computer to predict the reference picture quantization value for the current encoding picture comprises:
    computer readable program code for causing a computer to calculate an input to an inverse function $F^{-1}[x]$ by dividing the picture complexity of the previous encoding picture by a number of target bits allocated for the current encoding picture; and
    computer readable program code for causing a computer to determine the predicted reference picture quantization value, which is an output value of the inverse function $F^{-1}[x]$ using the calculated input.

21. The article of manufacture of claim 16, wherein the computer readable program code for causing a computer to produce the final MB reference quantization values for each MB of the current encoding picture comprises:
    computer readable program code for causing a computer to multiply the predicted reference picture quantization value with a reaction parameter ra, which has a value between 0 and 1, to produce a first product;
    computer readable program code for causing a computer to multiply the reactive MB reference quantization value with (1-ra) to produce a second product; and
    computer readable program code for causing a computer to add the first and second products to determine the final MB reference quantization value.

22. The article of manufacture of claim 21, wherein the computer readable program code for causing a computer to produce the final MB reference quantization values for each MB of the current encoding picture further comprises computer readable program code for causing a computer to determine the ra according to video buffer verifier (VBV) buffer fullness, wherein the computer readable program code for causing a computer to determine ra comprises:
    computer readable program code for causing a computer, if the VBV buffer fullness is less than a pre-defined value VBV_Min, to set ra to zero;
    computer readable program code for causing a computer, if the VBV buffer fullness is more than the pre-defined value VBV_Min and less than or equal to a pre-defined value VBV_Mid which is higher than VBV_Min, to set ra to (VBV_fullness−VBV_Min)*ra_Max/(VBV_Mid−VBV_Min), wherein ra_Max is a maximum value allowed for ra;
    computer readable program code for causing a computer, if the VBV buffer fullness is more than a pre-defined value VBV_Max which is higher than the VBV_Mid, to set ra to (VBV_buffer_size−VBV_fullness)*ra_Max/(VBV_buffer_size−VBV_Max), wherein VBV_Max is less than a VBV buffer size used; and
    computer readable program code for causing a computer, if the VBV buffer fullness is between VBV_Mid and VBV_Max, to set ra to ra_Max.

* * * * *